United States Patent [19]
Irwin et al.

[11] 3,947,670
[45] Mar. 30, 1976

[54] SIGNED MULTIPLICATION LOGIC

[75] Inventors: John M. Irwin, Clay; Noble R. Powell, Syracuse, both of N.Y.

[73] Assignee: General Electric Company, Syracuse, N.Y.

[22] Filed: Nov. 22, 1974

[21] Appl. No.: 526,373

[52] U.S. Cl................................ 235/164; 235/156
[51] Int. Cl.²........................................... G06F 7/39
[58] Field of Search............................ 235/156, 164

[56] References Cited
UNITED STATES PATENTS

| | | | |
|---|---|---|---|
| 3,617,723 | 11/1971 | Melvin................................ | 235/164 |
| 3,800,130 | 3/1974 | Martinson et al.................... | 235/156 |

*Primary Examiner*—R. Stephen Dildine, Jr.
*Attorney, Agent, or Firm*—Richard V. Lang; Carl W. Baker; Frank L. Neuhauser

[57] ABSTRACT

The present invention relates to signed multiplication logic for multiplying two serial binary numbers to obtain a serial binary product, the multiplicand containing magnitude and sign information in two's complement notation, the multiplier containing magnitude information, and the product containing magnitude and sign information in two's complement notation, all three bit streams occurring serially at equal word rates with the least significant bit first in time. The logic is composed of a plurality of largely identical multiplication cells which form partial products which are summed in largely identical summation cells to form the final product. Each multiplication cell stores a multiplier bit, contains a stage of a multiplicand shift register and a stage of a timing waveform shift register. Means are provided for truncation of the multiplicand and product rounding under timing waveform control. The logic is flexible and may be used to form single or double precision products. The design in utilizing two largely identical cells, with a minimum of communication paths at the cell and multiplication logic boundaries, is optimized for large scale integration using metal oxide semiconductor field effect transistor technology.

15 Claims, 10 Drawing Figures

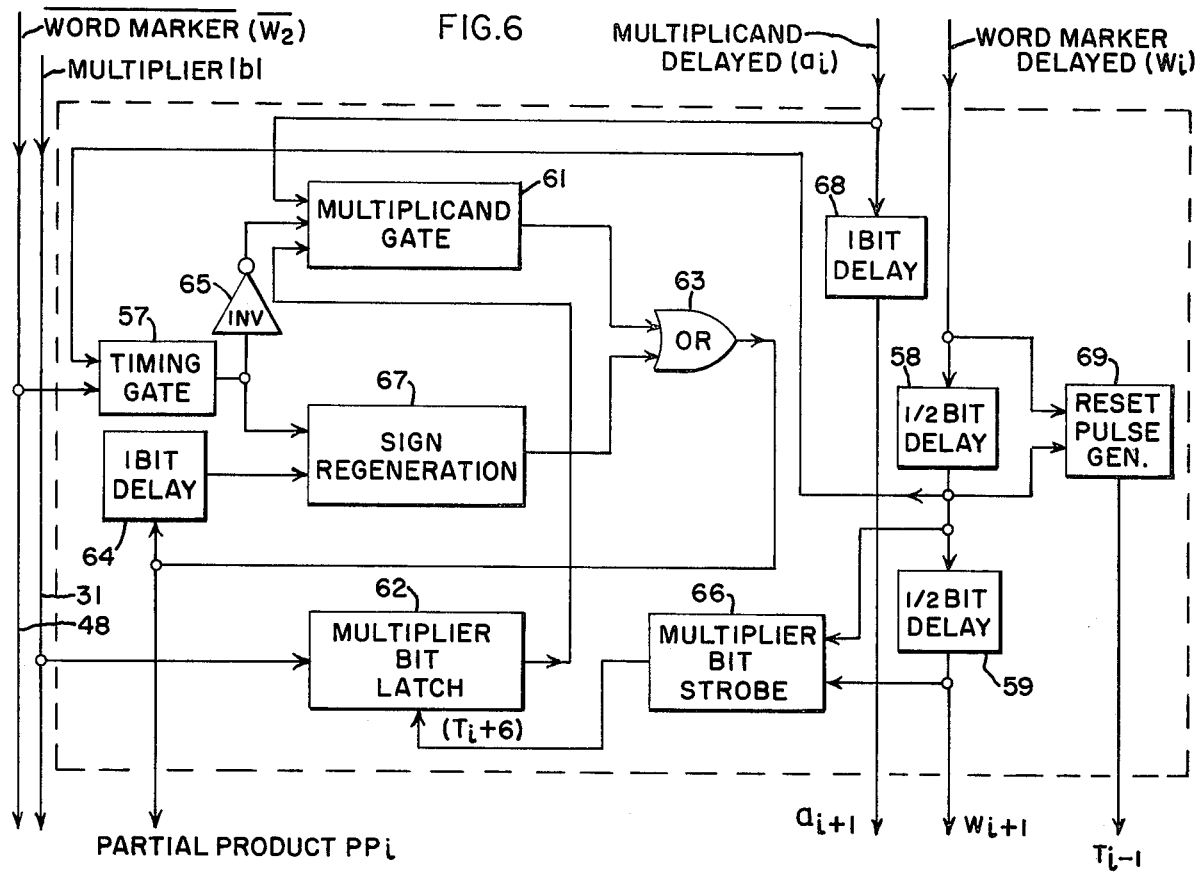
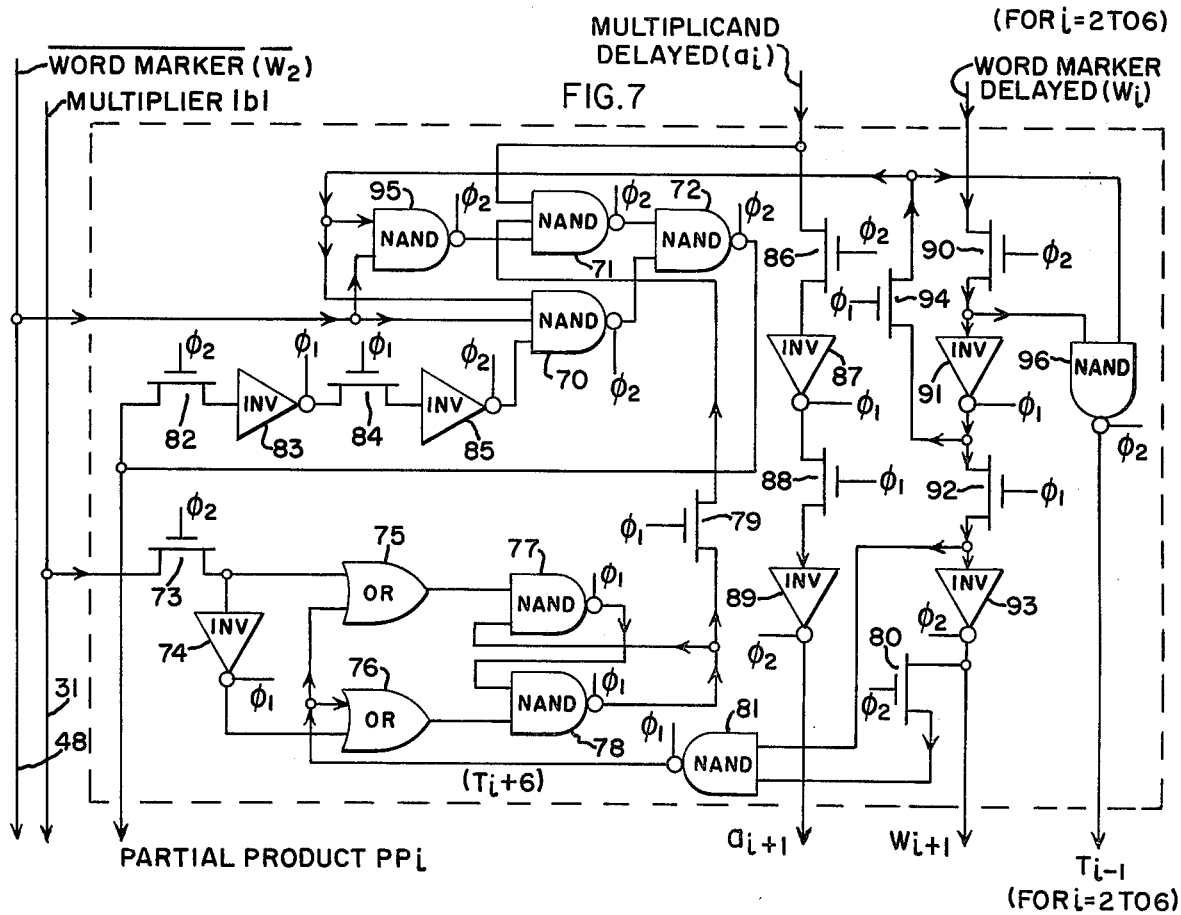

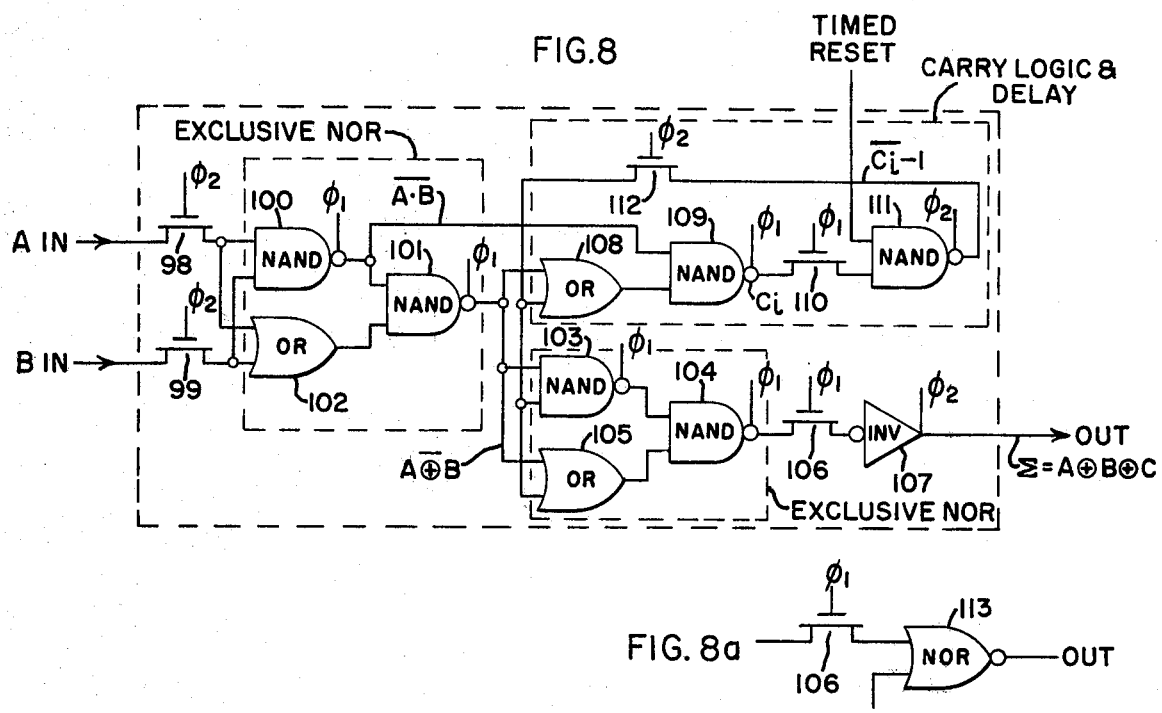
FIG. 8
FIG. 8a
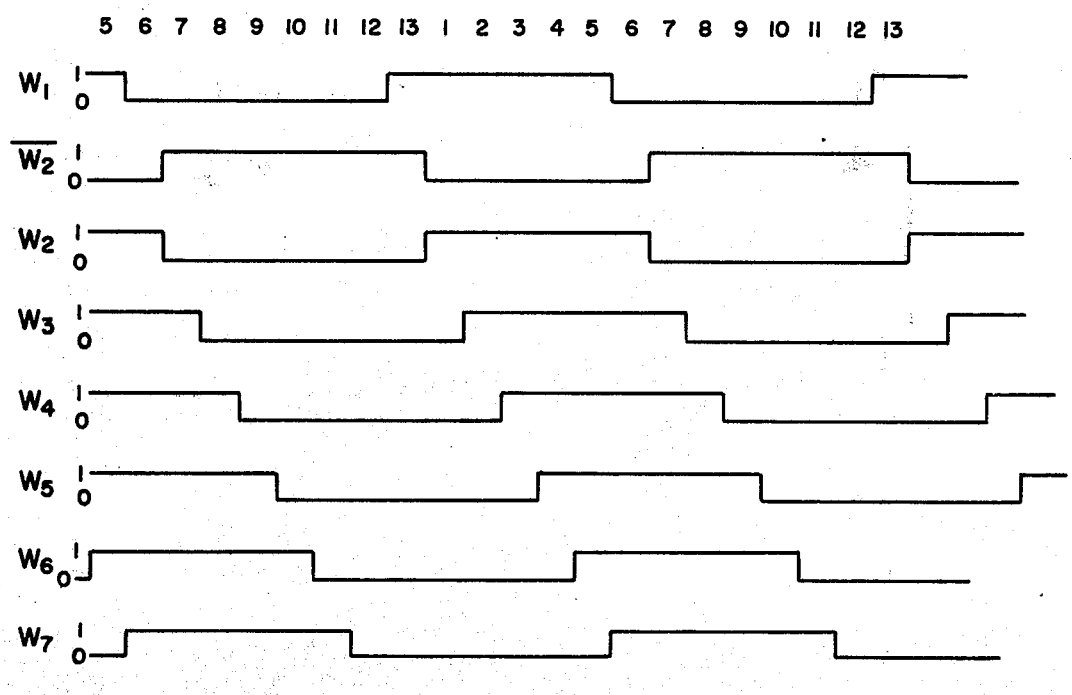
FIG. 9  WORD MARKER WAVEFORMS BIT TIMES

SIGNED MULTIPLICATION LOGIC

BACKGROUND OF THE INVENTION

1. Field of the Invention

The present invention relates to the field of digital computation and more particularly to sequential logic used to multiply two serial numbers to obtain a serial output, the product reflecting the sign of the multiplicand. The invention also relates to a method by which a single precision product may be efficiently obtained. The invention utilizes logic functions particularly adapted to large scale integration.

2. Description of the Prior Art

Multiplication of two binary numbers of $m$ and $n$ bits typically produces a product of $(m + n)$ bits. Assuming that "$m$" and "$n$" are equal, the product is of $2m$ (or $2n$) bits and is said to be of double precision. Since in the common case, the digits of the operands are available only to the extent enumerated, the least significant half of the bits forming the product may not be useful, possibly falling within the range of quantization (or other) error present in the operands. In cases where serial operands and serial products are concerned, the time and/or equipment required for producing the double precision product, and then rounding back down to a reasonable word length, may be impractical.

The serial format is particularly attractive in many computation systems, as where the number of input and output terminals is limited, and it is efficiently implemented in metal oxide semiconductor integrated circuit format. Also, typical signal and data processing requires the capability of handling sign and magnitude information. Two's complement notation is one of several known formats for signed arithmetic processing.

In a paper entitled "An Approach to the Implementation of Digital Filters", IEEE Transactions on Audio and Electroacoustics, September 1968, a single precision multiplication apparatus is described wherein the inputs and outputs are serial but in which the operands must be positive. In a second paper by Sypherd, "Design of Digital Filters Using Read-Only Memories", Proceedings of the National Electronics Conference, 1969, a serial-parallel multiplication apparatus is described using a read only memory for summation of partial products.

The implementation of certain logic functions in a manner suitable for large scale integration in MOS technology is treated in a book entitled *MOS Integrated Circuits* edited by William M. Penney and Lillian Lau, Van Nostrand Reinhold Company, New York 1972.

SUMMARY OF THE INVENTION

Accordingly, it is an object of the present invention to provide an improved serial mutiplication apparatus.

It is another object of the invention to provide an improved serial multiplication apparatus wherein one of the operands is signed.

It is still another object of the present invention to provide an improved serial multiplication apparatus wherein a single precision product is obtained without a time penalty.

It is another object of the invention to provide an improved serial multiplication apparatus wherein one of the operands is signed and wherein a single precision signed product is obtained.

It is a further object of the present invention to provide an improved serial signed multiplication apparatus of minimum geometry and requiring a minimum of communication paths when fabricated in large scale integration.

It is yet another object of the present invention to provide an improved serial signed multiplication apparatus utilizing repetitive cells of like design wherein minimum geometry and minimum communication paths at the cell and at the apparatus boundaries are achieved when fabricated in large scale integration.

It is an additional object of the present invention to provide a novel cell for formation of a partial product in a signed serial multiplier and adapted for repetitive use when so utilized, said cell leading to minimum geometry and minimum communication paths when fabricated in large scale integration.

It is another object of the present invention to provide a novel apparatus for performing complex, signed multiplication of serial data.

These and other objects of the invention are achieved in a novel signed multiplication logic designed for multiplying two serial binary numbers to obtain a serial binary product, the multiplicand containing magnitude and sign information in two's complement notation, the multiplier containing magnitude information and the product containing magnitude and sign information in two's complement notation, the multiplier, multiplicand and product bit streams occurring serially at equal word rates with the least significant bit first in time.

In accordance with the invention, the multiplication logic comprises a bus to which the multiplier bit stream is supplied; a plurality of binary storage elements coupled to the bus for storing the successive words of the multiplier bit stream, each storage element selecting a bit of predetermined significance from each serial multiplier word and storing the selected bit until a bit of like significance occurs in the succeeding word; a shift register having a plurality of connections at one bit intervals to which the multiplicand bit stream is supplied; a plurality of multiplication stages each connected for binary bit entry to a binary storage element and for multiplicand entry to a connection of the multiplicand shift register whose accummulated bits of delay increase in correspondence with the significance of the multiplier bit entered, each stage multiplying a consecutive selection of the most significant bits of a word of the multiplicand by a multiplier bit to form a serial partial product timed in correspondence with its significance; and a summation network coupled to the output of each of the multiplication stages for consolidation of the bit streams representing the partial products into a single bit stream equal to the product.

In accordance with further aspects of the invention, the multiplication stages include means for entering less than all of the bits of the multiplicand, the least significant bits being truncated in inverse relationship with the significance of the multiplier bit entered. In particular, the multiplicand bit truncation means comprises means for generating a timing waveform having a portion whose duration is equal to the bit times of the multiplier, and a second shift register to which said timing waveform is supplied having connections at one bit intervals, each multiplication stage being connected to said timing shift register to obtain a timing signal for controlling the number of the more significant bits of the multiplicand entered to correspond with the significance of the multiplier bit entered.

The multiplication is performed by a three input gate to which a delayed multiplicand, a stored multiplier bit and the timing signal are applied, the timing signals at each stage having a duration which is increased in one bit increments in accordance with the delay accorded to the timing waveform. The three input gate logically ANDs the three inputs to produce an output.

In accordance with a further aspect of the invention, a bus is provided in each multiplication stage for generating a timing signal for control of the multiplicand bit entry. The timing gate has one input coupled to the fixed delay timing waveform bus to initiate the timing signal and another input coupled to the timing wave shift register to terminate the timing signal.

Each multiplication stage additionally comprises means responsive to the timing signal to repeat the sign bit of said multiplicand the number of bits required to complete the high order portion of the partial product. The full length partial product is then obtained by forming a logical OR of the output of the three input gate and the output of the sign repeating means.

Summation of the partial products is achieved by a collection of ranked summers, each having two serial data inputs and each producing a serial data output representing the sum of the two inputs after a one bit delay. The summers are arranged in successively diminished ranks until the serial data is consolidated into a single stream. Means are also provided in each summer for resetting the internally stored carry bits as the least significant bit of each word passes through. The reset means comprises one or more reset pulse generators which are timed by a connection to the timing waveform register and each providing an output pulse at an appropriate time to reset the internally stored carry bits.

The summer in the last rank is provided with means for zeroing one or more of the least significant bits of each word of the serial product.

A rounding value is also introduced to compensate for multiplicand and product truncation. The rounding value means comprises one or more pulse generators, each having an input coupled to a connection on said timing waveform register for sensing passage of a timing waveform at a time corresponding to the entry of a bit of a given significance at said first rank of summers and producing an output pulse at said time, and an OR gate for production of the rounding value to which said pulse generator outputs are coupled and producing one or more output pulses corresponding to a desired rounding value, the OR gate output being coupled to the input of a summer in said first rank for addition to the final product.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

FIG. 6 is a simplified block diagram of the multiplication input gate used repetitively in FIG. 4;

FIG. 7 is a logic diagram of the multiplication input gate of FIG. 6;

FIG. 8 is a logic diagram of a serial summer used repetitively in the block diagram of FIG. 3; with FIG. 8A illustrating the modification required of the last summer for zeroing the output; and FIG. 9 is a diagram of control waveforms that are internally derived and used to time the operation of the signed multiplication logic of FIG. 4.

DESCRIPTION OF THE PREFERRED EMBODIMENT

Figure 1:
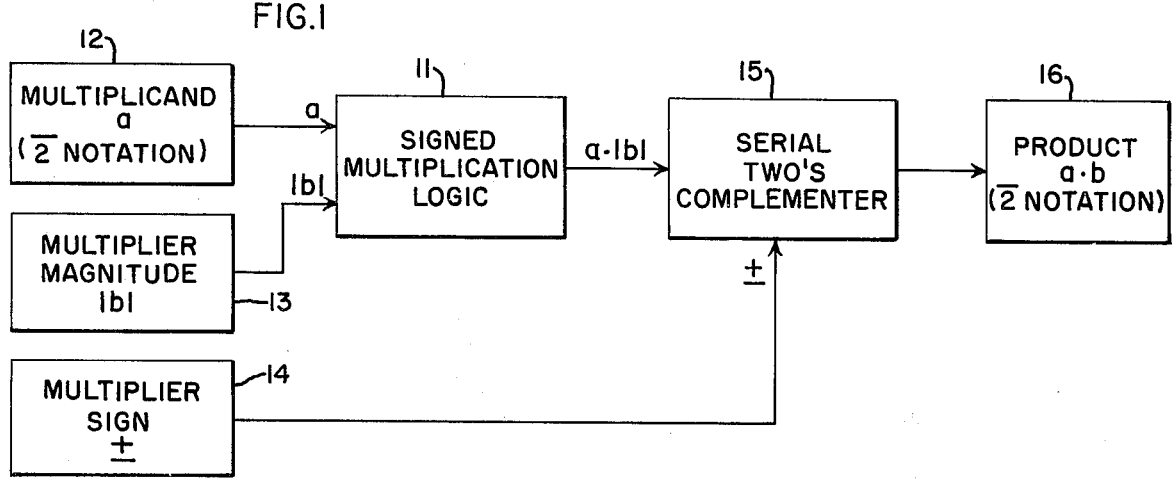
FIG. 1 is a block diagram illustrating the signed multiplication logic of the invention connected to multiply a multiplicand in two's complement notation by a multiplier in sign magnitude notation to produce a product in two's complement notation.

The block diagram in FIG. 1 illustrates an application of the signed multiplication logic of the present invention. The multiplication logic 11 is coupled to two sources 12, 13 of serial input data and produces a single precision product also in serial form. In performing the multiplication of two serial input numbers, a very efficient usage of time is achieved. The signed multiplication logic produces a single precision product requiring only one bit more per word than the multiplicand. If the multiplicand is of 12 bits, the output product of 10 bits is formed in an output word interval of 13 bit times. The multiplier is fixed in length; the multiplicand can be variable in length and is usually longer than the multiplier.

The signed multiplication logic 11 performs two quadrant multiplication. The multiplicand ($a$) from source 12 is provided in two's complement notation allowing positive or negative values. The multiplier $|b|$ from source 13 is a magnitude only. The output of the signed multiplier 11 is the product:

$$a \cdot |b|$$

in two's complement notation. The operand ($a$), being originally in two's complement notation, implicity contains both magnitude and sign information, and the product retains both. The multiplier ($|b|$), however, is introduced with magnitude information only and the product term reflects that magnitude only. Thus, assuming that the product of two real operands may be apportioned into four quadrants as a function of their signs, the present apparatus may be characterized as a two quadrant device:

$$(+a) \cdot (+b); (-a) \cdot (+b)$$

If it is desired to introduce sign information in connection with the multiplier $b$ to achieve four quadrant multiplication, i.e.;

$$(+a) \cdot (+b); (-a) \cdot (+b); (+a) \cdot (-b); (-a) \cdot (-b)$$

then the sign of the multiplier $b$ may be introduced from a separate source 14 to control a two's complementer 15, which is coupled to the output of the signed multiplier 11 as shown in FIG. 1. When this is done, the product at the output of 15 implicitly contains magnitude and sign information reflecting both operands and appears in two's complement notation.

The signed multiplication logic of the present invention may be used either with a two's complementer 15 in the manner illustrated in FIG. 1 or, when the sign of the multiplier is always positive, without the two's complementer to obtain the $a\cdot|b|$ quantity.

Figure 2:
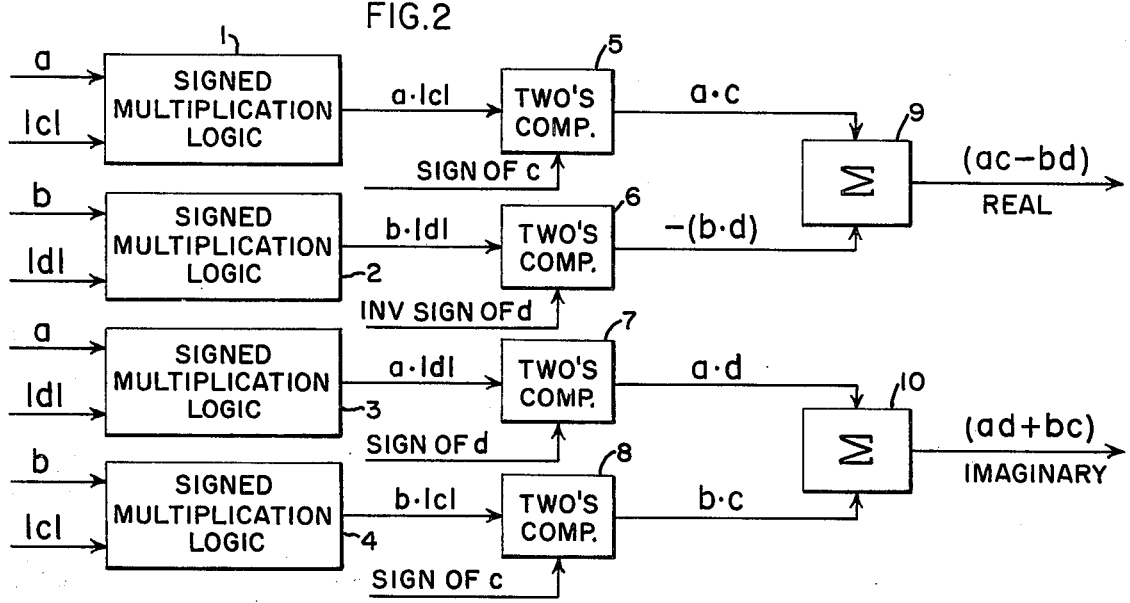
FIG. 2 is a block diagram illustrating the usage of a plurality of signed multiplication logic units to perform complex multiplication.

The present invention has further application to the performance of complex multiplication as illustrated in FIG. 2. In that figure, a first complex quantity $(a + jb)$ is multiplied by a second complex quantity $(c + jd)$. The product of the multiplication may be represented as having a real part $(ac - bd)$ and an imaginary part $[j (ad + bc)]$. The $(a)$ multiplicands, applied to the inputs of the signed multipliers 1, 3 and the $(b)$ multiplicands, applied to the inputs of the signed multipliers 2, 4, are in two's complement form. The multipliers applied to the other inputs of the signed multipliers 1, 2, 3 and 4 are respectively the magnitudes $|c|$, $|d|$, $|d|$ and $|c|$. The outputs of the signed multipliers 1-4 respectively contain the products $(a\cdot|c|)$; $(b\cdot|d|)$; $(a\cdot|d|)$ and $(b\cdot|c|)$.

The data inputs of the two's complementers 5, 6, 7 and 8 are connected to the respective outputs of signed multipliers 1, 2, 3 and 4 to convert the output products to true four quadrant quantities containing sign and magnitude information from both operands. The sign information corresponding to the absolute multiplier quantities is coupled to the sign input of the two's complementers for this purpose. In particular, the sign of multiplier $(c)$ is provided to two's complementer 5; the sign of $(d)$ is provided to two's complementer 6, (and a sign inversion to account for the $(j^2)$ factor should be introduced at this point); the sign of multiplier $(d)$ is provided to two's complementer 7; and the sign of multiplier $(c)$ is provided to two's complementer 8. Thus, at the outputs of the four two's complementers 5-8 a full four quadrant multiplication of their operands occurs and the products appear in two's complement notation.

The complex product is derived by combining the outputs of the four two's complementers 5-8. The real part of the output quantity is $(ac-bd)$ and is formed by combining the outputs of the two's complementers 5, 6 in the summer 9. Similarly, the imaginary part of the output quantity is $[j (ad + bc)]$, and is formed by combining outputs of the two's complementers 7 and 8 in the summer 10.

Figure 3:
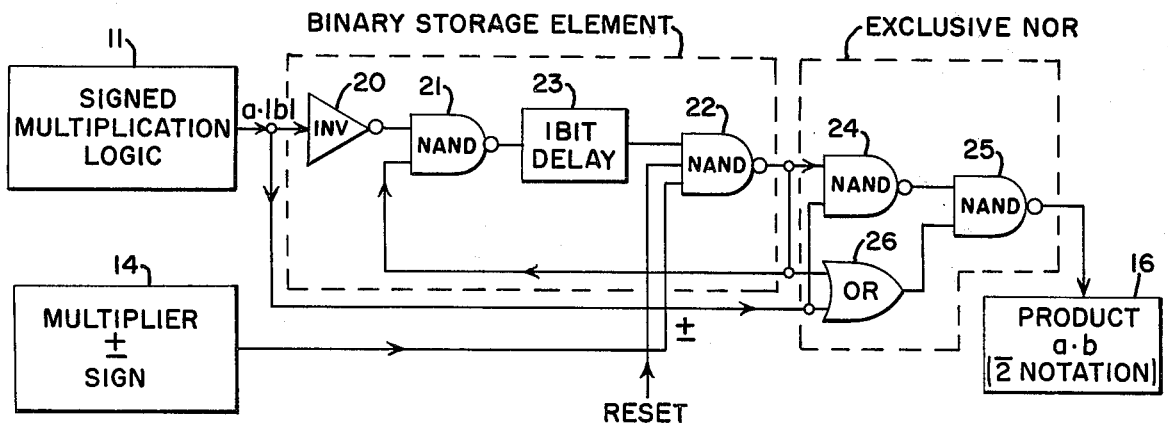
FIG. 3 is a logic diagram of a serial two's complementer suitable for use in the configurations of FIGS. 1 and 2.

The serial two's complementers, element 15 in FIG. 1 and elements 5 to 8 in FIG. 2, are illustrated in greater detail in FIG. 3. They are the subject of the separate application of John M. Irwin et al. filed Nov. 4, 1974, U.S. application Ser. No. 520,542 and entitled "Serial Two's Complementer". The two's complementer is designed to take a serial binary number in two's complement notation and change the algebraic sign when desired. A two's complementer will change the algebraic sign of the $a\cdot|b|$ quantity (in two's complement notation) from 11, thus reflecting the effect of the sign of the quantity $|b|$. The output product at 16 is $(a.b)$ (in two's complement notation) and reflects the sign of both input quantities.

The logical design of the two's complementer is illustrated in FIG. 3. It makes preferential use of NAND devices. The design provides a minimum geometry configuration when implemented using metal oxide semiconductor field effect transistors (MOSFETS) in large scale integration. As shown by the dotted outlines in FIG. 3, the serial two's complementer is composed of two major blocks, a binary storage element and an exclusive NOR. In principle, the circuit senses the first "1" in the bit stream and then after a one bit delay, inverts the succeeding bits.

The binary storage element is implemented by an inverter 20, two NAND gates 21, 22, a one bit dynamic delay (23). The bit stream from the signed multiplication logic 11 is coupled through inverter 20 to the NAND gate 21, thence through the one bit delay 23 to NAND gate 22. Two other inputs of the NAND gate 22 provide control and reset input connections. The output of the NAND gate 22 is coupled back to a second input of the NAND gate 21 to provide regeneration for the binary storage element.

The exclusive NOR gate is implemented by two NAND gates 24, 25 and an OR gate 26. The NAND gate 24 and the OR gate 26 each have one input connected to the complimentary output of the binary storage element. The other inputs of the NAND gate 24 and the OR gate 26 are connected to receive the bit stream from the signed multiplication logic 11. The output of the NAND gate 24 and the OR gate 26 are connected to the separate inputs of the NAND gate 25, at the output of which the $(a\cdot b)$ product appears.

In the two's complementer, the binary storage element is designed to respond to the first "1" in the input bit stream and to produce a change in output after a one bit delay. The exclusive NOR, which has one input connection coupled to the bit stream from the signed multiplication logic 11 and the other to the complementary output of the binary storage element, is designed to invert the input bit stream when the (complementary) output of the binary storage element goes to a zero state. The output of the exclusive NOR provides the negated number.

Figure 5:
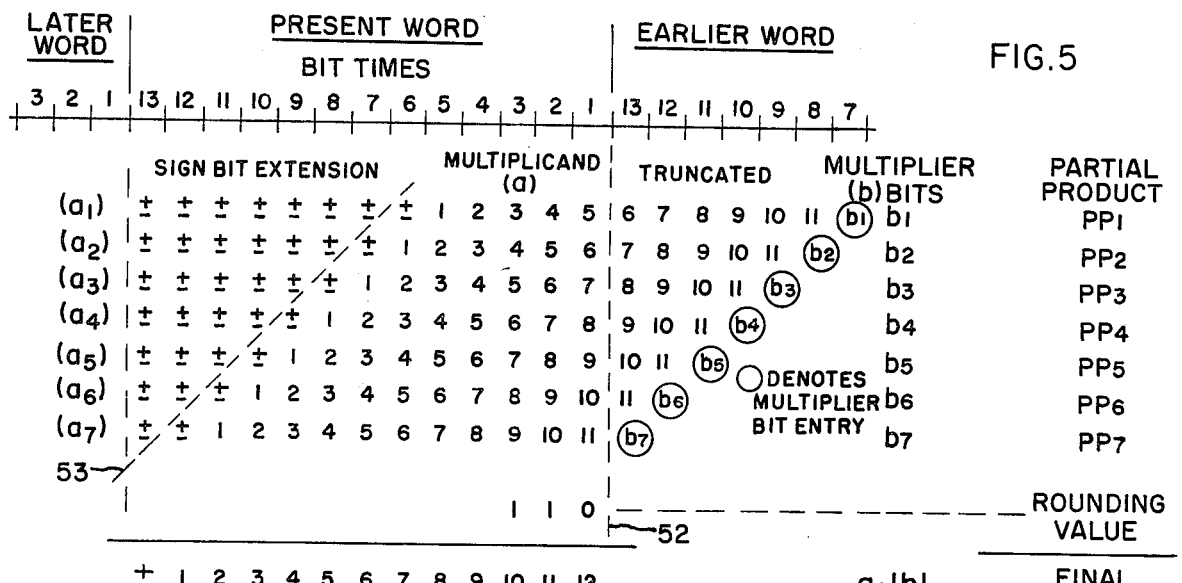
FIG. 5 is a sequencing diagram of the handling of the multiplicand and the multiplier; the formation of partial products; and their combination to obtain the product.
Figure 4:
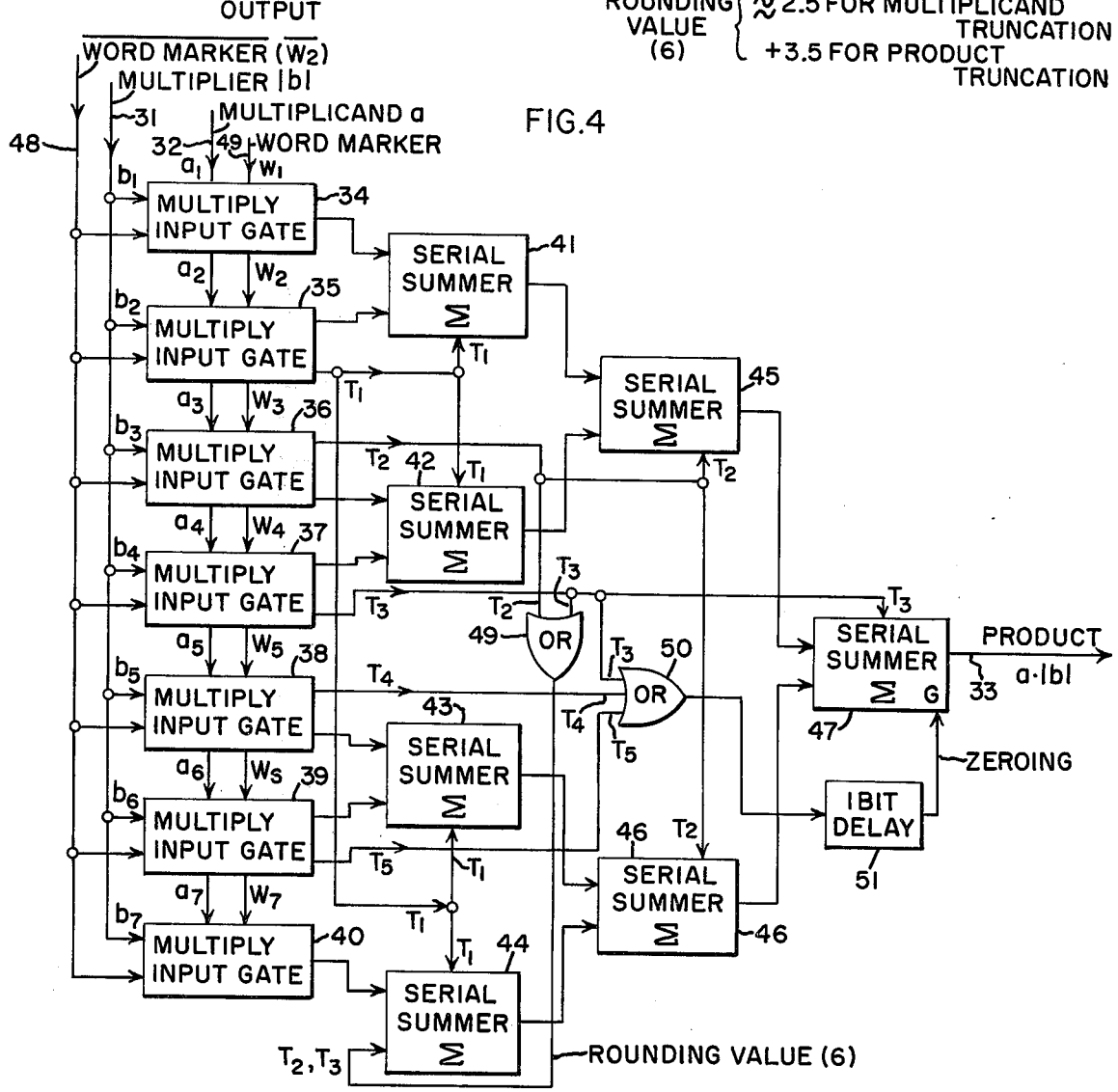
FIG. 4 is a block diagram of the signed multiplication logic.

The operation of the signed multiplication logic may best be understood by reference to the block diagram provided in FIG. 4 and to the sequencing diagram of FIG. 5. In the following description it is assumed that the serial multiplier contains 7 bits of magnitude information which are applied to the signed multiplier with the least significant bit first in time. Normally, the multiplier is provided with a separate sign bit as well. The serial multiplicand is of 12 bits and appears in two's complement notation with the least significant bit first and the sign bit last. The multiplier and multiplicands are both applied at a word rate consistent with a 13 bit times per word period. With the foregoing selections, one may obtain a single precision product after a 9 bit transport delay rounded from 13 bits to 10 bits and also appearing at a 13 bit times per word period.

The components of the multiplication logic, their interconnections, their functions, and the sequence in which their functions are performed will now be described. In FIG. 4, the novel signed multiplication logic 11 of FIG. 1 is depicted in a simplified block diagram. The blocks, while not corresponding to logical designations, correspond to "cells", which, in the preferred integrated circuit embodiment, are repetitively reproduced in largely identical form throughout the logic. The multiplication logic may be seen to comprise a succession of seven interconnected multiplication or "multiply" input gates 34 through 40, which are cells of a first type, and a summation tree including serial summers 41 through 47, which are cells of a second type.

The multiplication cells, among other functions, form the partial products which are summed by the summer cells to form the final product.

The input, internal and output data paths between the cells of the multiplication logic are as follows. The serial multiplier ($|b|$) input data stream available from bus 31 is directly applied to the $b_i$ data input of each multiplication cell (34 to 40).

The serial multiplicand ($a$) input data stream available from line 32 is applied directly to the $a_1$ data input of the initial multiplication cell 34 only and indirectly supplied to each of the $a_i$ data inputs of the multiplication cells 35 to 40 via successive internal one bit delays. The multiplication cells each have internal connections (not shown in FIG. 4) to enter the multiplicand data stream into that cell for generating the partial product associated with that cell. Except for the last, each cell is provided with a path containing a one bit delay for transferring the multiplicand to the next cell. Thus, the multiplicand data stream directly available from line 32 is transferred from multiplication cell 34 with one bit delay to the $a_2$ data input of multiplication cell 35. Similarly, the muliplicand data stream is transferred from multiplication cell 35 to multiplication cell 36, from 36 to 37, from 37 to 38, from 38 to 39, and finally, from 39 to the multiplication cell 40, in which a delay is not used. In all, 6 bits of delay are provided in transferring the multiplicand from the input of the initial to the input of the terminal multiplication cells. The delays form stages of a shift register for the multiplicand having seven connections at one bit intervals.

The partial products formed in the multiplication cells 34 through 40, which are serial data streams, are supplied to the first rank (41 through 44) of summer cells. In particular, the partial product outputs of multiplication cells 34 and 35 are applied to the two inputs of the serial summer cell 41; the partial product outputs of multiplication cells 36 and 37 are applied to the two inputs of summer cell 42; similar outputs of multiplication cells 38 and 39 are applied to the two inputs of summer cell 43 and finally, the partial product output of the last multiplication cell 40 is applied, with a rounding value (whose source will be described subsequently), to the two inputs of the last of the first rank of summer cells 44.

The partial products are combined in the summer cells 41 through 47 to obtain the final product. The summers 41 through 47 are arranged in a three rank tree and the process of consolidating the separate streams into a single data stream requires a three bit time interval. The summers of the first rank (41 through 44) each provide a single data stream after one bit of time delay whose value is the sum of the two input data streams. The output data streams of the summer cells 41 and 42 in the first rank are applied to the separate inputs of summer cell 45 in the second rank. The output data streams of first rank summer cells 43 and 44 are applied to the separate inputs of the second rank summer cell 46. The outputs of the second rank summer cells 45 and 46, which also appear after one bit of delay, are then applied to the separate inputs of the third rank summer cell 47. The consolidated data stream appears at the output of the serial summer 47 after another bit of delay.

The final product $a\cdot|b|$ of the signed multiplication logic appears at the output line 33. Six bits of time delay are required for the multiplicand to reach the last multiplication cell and 3 bits of delay are required for summation, making a total transport delay of 9 bits. A more particularized understanding of the formation of the product may be obtained from a consideration of the sequencing diagram of FIG. 5.

The sequencing diagram of FIG. 5 illustrates the sequencing of the multiplicand data stream, the multiplier data stream and the formation of the product data stream. The multiplicand "$a$" is multiplied by a bit $b_i$ of the multiplier in each multiplication cell (34 to 40) to form each partial product (PP1 to PP7). The partial products are then summed in the summation tree 41 to 47 to form the single precision final product ($a\cdot|b|$). The diagram shows the truncation of the multiplicand, trunction of the final product, rounding of the product to compensate for multiplicand and subsequent product truncation to achieve a single precision output, and sign bit extension for forming validly signed partial products.

The multiplicand and multiplier positions are plotted against arbitrary bit times at the thirteen bit time word rate of all three data streams. The sequencing diagram assumes a twelve bit multiplicand "$a$" occurring during the present 13 bit product word and a 7 bit ($b1$ to $b7$) multiplier $|b|$. Arbitrary bit times of the present word of the $a\cdot|b|$ are indicated at the top of the diagram. Time $T_1$ corresponds to initiation of partial product summing using summers 41 –47 of FIG. 4. The time increases from right to left so that numeric values can be written in natural order with least significant bit on the right. The word earlier than the present word thus appears to the right in the diagram and the word later than the present word appears to the left in the diagram.

The same multiplicand word having eleven low order bits and a sign bit in two's complement notation is tabulated in FIG. 5 at a succession of seven positions referenced with respect to the bit times $T_1$ to $T_{13}$. In the serial data format applicable to the arithmetic processes herein, the least significant bit is first in time and the last bit is a sign bit. In the uppermost tabluation of the multiplicand, the bit numbers 5 through 1 and the sign bit of the multiplicand occur within the bit times $T_1$ to $T_6$ of the "present" word. In the second tabulation, the multiplicand is displaced one bit to the left (or later in time), and the magnitude bits 6 through 1 and the sign bit of the multiplicand occur during the times $T_1$ through $T_7$ of the present word. In each successive tabulation, the multiplicand is displaced one bit to the left. In the seventh and last tabulation, the bits 11 through 1 and the sign bit occur in the bit times $T_1$ through $T_{12}$ of the "present" word. The successively displaced tabulations illustrate the passage of a word of the multiplicand through successive stages of the shift register whose stages are made up of the one bit delays disposed in each multiplication cell and utilized by each multiplication cell during a pre-arranged succession of bit times.

The multiplier word is tabulated in a column one bit at a time with the bits in a line with successively displaced tabulations of the "present" multiplicand word. The least significant bit ($b_1$) of the multiplier is at the top of the column and the most significant bit ($b_7$) is at the bottom of the column. The multiplier word is entered one bit at a time, least significant bit first, during the times $T_7$ to $T_{13}$ of the prior word time as denoted on the diagram by the circled bits $b_1$ to $b_7$. The entered bits are "latched" in the multiplication cells while part or all of the multiplicand word is accessed from a stage of the shift register and streams through the portion of the cell forming the partial product.

The final product $a.|b|$, as implied by the sequencing diagram, is formed by successively multiplying a word of the multiplicand ($a$), taken a word or less at a time, by a word of the multiplier, taken one bit at a time. If a double precision product is sought, the full multiplicand word is used in formation of each partial product. However, if a single precision product is sought, consistent with the precision of the multiplicand and multiplier, then truncation of the multiplicand prior to formation of the product and subsequent rounding of the product is desirable. Truncation, as will be detailed, permits very substantial savings in time and allows for full serial processing of the input and output data streams.

If a single precision product is formed, the multiplicand is truncated so that all bits contributing less than a given value to the final product are discarded. With reference to FIG. 5, the value of the bits in the multiplicand increase as one proceeds from $T_1$ to $T_{13}$. In addition, the upper multiplicand tabulations are multiplied by the least significant bits of the multiplier and thus contribute only to the lower valued bits of the final product. The lower multiplicand tabulations are multiplied by the more significant bits of the multiplier and thus contribute to both lower and higher valued bits of the final product. In short, the tabulations of the multiplicand have been successively displaced in such a way in FIG. 5 that the individual bits of the multiplicand contribute values to the final product in direct relation to their position along the bit time coordinate.

Thus, to achieve a given accuracy in the final product, bits in the tabulations of the multiplicand occuring before an arbitrary bit time (e.g. $T_1$) are truncated and take no part in forming the individual partial products. The first partial product PP1 thus includes the multiplication of the last (and most significant) six bits of the multiplicand ($a$) by the least significant bit of the multiplier. In all, the seven successive partial products PP1 to PP7 are formed in the multiplier cells (34–40) by multiplying the following bits of the multiplicand by the enumerated bits of the multiplier.

| Partial Products | Multiplicand ($a$) Bits | Multiplier $|b|$ Bits |
|---|---|---|
| PP1 | sign & 1–5 | 1 (LSB) |
| PP2 | sign & 1–6 | 2 |
| PP3 | sign & 1–7 | 3 |
| PP4 | sign & 1–8 | 4 |
| PP5 | sign & 1–9 | 5 |
| PP6 | sign & 1–10 | 6 |
| PP7 | sign & 1–11 | 7 (msb) |

The formation of the final product from the partial products PP1 to PP7 is performed by the summation tree of FIG. 4 with a rounding value of 6, earlier alluded to and compensating for the statistical average of the numbers truncated in the multiplicand and truncated (or zeroed) in the product. The rounding value is inserted into the last (44) of the first rank of serial summers. As will be subsequently explained, the duration of the word marker (illustrated in FIG. 9) or "timing waveform" controls the truncation triangle of the multiplicand, and the zeroing of the final product. If the duration of the word marker is extended, the truncation triangle may be reduced to zero and product zeroing eliminated so as to obtain a full double precision product without any loss in accuracy. The final product $a\cdot|b|$ is transmitted from the final serial summer 47 at 13 bit times per word, with the first three bits in times $T_1$ to $T_3$ zeroed. The final single product $a\cdot|b|$ is in a ten bit, two's complement format occuring at 13 bit times per word.

In summary, the sequencing diagram of FIG. 5 illustrates the entry of the multiplier $|b|$ and the multiplicand ($a$) and the formation of the final single precision product $a\cdot|b|$. The manipulation of the multiplier, the multiplicand, the two truncations, one of which is involved in rounding, and extension of the two's complement sign for variable word length partial products, is the concern of the following discussion. The details of the individual cells making up the muliplication logic and the timing of the multiplication process will now be discussed.

A simplified block diagram of a multiplication cell is illustrated in FIG. 6. The simplification of FIG. 6 omits a detailed treatment of the inversions, such as occur for the delayed word marker; of the delays, such as the half bit delay that occurs in the multiplication gate and which when added to an initial half bit of delay depicted provides one bit of delay of the word at the multiplicand gate; or of the clocking which occurs in two phases, $\phi_1$ and $\phi_2$. These details are illustrated in the logic diagram of FIG. 7 and explained in the text associated with that figure.

In FIG. 6, each multiplication cell contains a multiplicand gate 61, which takes the primary role in forming one of the partial products (PP1 to PP7) and which uses a selected bit from the multiplier and a variable number of the most significant bits of the multiplicand (as described above). Each multiplication cell contains a "first" one bit delay 68 formed of two one-half bit delays. Two phase inversions, which are not shown in FIG. 6, accompany the half bit delays. Since the multiplication input gate connections are at one bit intervals only, the taps at the multiplication input gate boundaries derive only the uninvered wave. When all the multiplier cells are interconnected, the "first" one bit delays 68 collectively form the multiplicand shift register mentioned earlier. Each multiplication cell contains a second one bit delay also formed of two one-half bit delays (58, 59) and two inversions (not shown in FIG. 6). When all the multiplication cells are interconnected, these "second" delays (58, 59) collectively form a second shift register to which a "word marker" or timing waveform is applied for setting the word length of the multiplicand, timing the multiplier bit selection and timing the subsequent summation process. A final element in the multiplication cell is the means for regenerating the sign bit required for retaining the two's complement notation with a partial product represented by a shifted multiplicand.

The partial product (PP1 to PP7) less the sign regeneration portion is formed in the block 61 entitled "Multiplicand Gate" of a given multiplication cell (34–40). The multiplicand gate 61 has three inputs and a single output and provides a "1" output when all three inputs are "1's". Here it should be noted that a "one" or "zero" designation is used synomonously with "true" or "false", respectively, or with a signal's "presence" or "absence". Also, inversions that may occur in the actual implementation are temporarily ignored. The multiplicand ($a$) bit stream from line 32 of FIG. 4 is applied after a delay attributable in part to the multiplicand shift register, to a first input of the multiplicand gate 61; a selected bit ($b_i$) of the multiplier "$b$" is derived from bus 31, stored by a multiplier bit latch 62 and applied to a second input of 61; and a timing control signal is applied from timing gate 57, through inverter 65 to the third input of the multiplicand gate 61.

The multiplicand in a given multiplicand gate 61 is delayed by one bit less than the position of the multiplication cell in the FIG. 4 sequence. In the first multiplication cell of the FIG. 4 sequence, the multiplicand ($a_1$) from input 32 is directly connected to the first input of the multiplicand gate 61 and to the input of the first one bit decay (corresponding to 68). In the subsequent multiplication cells, the one bit delay (corresponding to 68) is connected to the one bit delay (corresponding to 68) in the prior cell. The one bit delays (corresponding to 68) are thus serially connected to the multiplicand line 32, and taken together form the multiplicand shift register. Since the multiplicand gate 61 of a given multiplier cell is connected to the input side of the one bit delay (68) of the cell, the last multiplication cell (40 in FIG. 4) does not require a delay for the multiplicand. The successive delays of the multiplicand at the multiplicand gate is zero bits in the first multiplication cell 34 (input $a_1$); one bit in the second (35) (input $a_2$); two bits in the third (36) (input $a_3$); three bits in the fourth (37) (input $a_4$); four bits in the fifth (38) (input $a_5$); five bits in the sixth (39) (input $a_6$); and six bits in the seventh and last cell (40) (input $a_7$).

The enumerated delays of the multiplicand bit stream bring about the successive displacements of the multiplicand in the tabulations of FIG. 5. Thus, the serial multiplicand data streams through each multiplication cell (34–40) for multiplication of the multiplicand (or some part thereof) by the multiplier bit entered into that cell. The delays cause each successive tabulation to add a less significant multiplicand bit within the time limits of the "present" output word. This permits the multiplicand to be truncated in the formation of the partial products by gating the entry of the multiplicands in all multiplication cells at selected bit times (referenced to the product data stream).

The multiplier bit selected for formation of the partial product at a given multiplication cell corresponds to the sequential position of the cell in FIG. 4. In other words, the multiplier bits 1 to 7 are selected in multiplication cells 34 through 40, respectively. Multiplier bit selection in a given multiplication cell entails the multiplier bit latch 62, the multiplier strobe 66, the two half bit delays 58 and 59 (and two inversions not shown in FIG. 6), which are coupled in the path to the "word marker" input 49 of FIG. 4. At input 49, the word marker ($w_1$) which is instrumental in bit selection, commencing at nominal bit time T6 (FIG. 9), is a "0" for seven bits duration ($T_6 - T_{13}$) and is a "1" for six bits duration ($T_{13} - T_6$), the sequence repeating at the 13 bit times per word period. Since the word marker delays (58, 59) are serially connected from cell to cell, the word marker reaches each succeeding multiplication cell one bit later. Collectively, the delays form a word marker shift register. The strobing connection made in each cell to the word marker register is thus one bit later than in the prior cell. As will be explained below, the connection within the cell to the "word marker register" allows for multiplier bit entry during bit times $T_7$ to $T_{13}$ of the prior word.

The multiplier bit latch 62, which will be treated initially, selects a bit from the multiplier bit stream, stores it for the duration of a word (13 bit times) and couples it to the "second" or multiplier input of the multiplicand gate 61. The data input to the multiplier bit latch 62 is coupled to the multiplier bus 31 carrying the multiplier bit stream. The control input of latch 62 is coupled to the output of the multiplier bit strobe 66 for the selection of a particular bit from the bit stream. The selected bit from the multiplier bit stream then appears at the output of the multiplier bit latch and is coupled to the multiplicand gate 61. The multiplier bit latch 62 produces and latches a "1" or "0" at the output corresponding to the condition on the multiplier bus 31 when the strobing pulse from 66 occurs. The latch holds the "1" or "0" condition until the next strobing pulse occurs a word later. At the succeeding pulse, the latched value is continued or replaced.

The multiplier bit strobe 66 produces a strobing pulse at a time ($t_1 + 6$) (i.e., $T_7$ in multiplication cell 34), in response to presence of the word marker at its internal connection to the word marker register. As shown in FIG. 6, the multiplier bit strobe 66 has two inputs coupled respectively to the input and output of the half bit delay 59. By these connections it senses passage of the word marker and produces an output signal to the latch 62 at a nominal one bit of delay after the edge of the word marker at the cell boundary. As previously noted, the block diagram of FIG. 6 is simplified in that it does not treat the inversion nor the $\phi_1$ and $\phi_2$ transmission gate, which together allow the strobe to sense the "midword" edge of the word marker (i.e., bit time $T_6$ at the input to the first cell). Thus, in the first multiplier cell (34), a pulse is produced by the strobe 66 at a nominal bit time $T_7$. Assuming that the multiplier bit stream, also of seven bits duration, is in proper synchronism with the word marker, the first bit is latched in the first multiplier cell at the nominal bit time $T_7$ as shown in FIG. 5. Subsequently, the second multiplier bit is latched in the second multiplier cell 35 at the bit time $T_8$; the third multiplier bit in the third cell 36 at time $T_9$; and so on until all seven multiplier bits are stored by the bit time $T_{13}$ of the earlier word.

Timing control of the multiplication process in the formation of each partial product is effected by the timing gate (57 of FIG. 6; 95 of FIG. 7). The timing gate 57 has one input coupled to the word marker bus 48 and the other input to the word marker register. The first input connection provides the word marker at the same time for all cells, while the second input connection provides a word marker at successive one bit delays as one follows the sequence from cells 34 to 40. The timing gate responds to the interval defined by the undelayed and the delayed word marker and provides an enabling output during that interval coupled to the third input of the multiplicand gate 61.

Treating the above connections in somewhat greater detail; the bus 48 to which one input of the gate 57 is connected, provides the inverted word marker $\overline{w_2}$. The overline denotes inversion of the word marker and the subscript denotes the $n-1$ bits of delay. The waveforms referred to are illustrated in FIG. 9. The other input of gate 57 is connected to the output of the ½ bit delay (58). Taking into account an unillustrated inversion and a half bit of delay at the gate input, the second input waveform at the input to gate 57 may also be denoted $\overline{w_2}$. The output of the gate 57 ANDs the two inputs and is inverted by inverter 65. Thus, at the first cell 34, the two NANDed waveforms are anti-coincident and produce a "1" output during the period of $T_1$ to $T_6$. The operation of gate 57 and inverter 65 in that and the successive cells may be tabulated as follows:

| | Gate 57 and Inverter 65 Output | |
|---|---|---|
| Cell 34 | $\overline{W_2} \cdot \overline{W_2}$ | $= T_{1-6}$ |
| 35 | $\overline{W_2} \cdot \overline{W_3}$ | $= T_{1-7}$ |
| 36 | $\overline{W_2} \cdot \overline{W_4}$ | $= T_{1-8}$ |
| 37 | $\overline{W_2} \cdot \overline{W_5}$ | $= T_{1-9}$ |
| 38 | $\overline{W_2} \cdot \overline{W_6}$ | $= T_{1-10}$ |
| 39 | $\overline{W_2} \cdot \overline{W_7}$ | $= T_{1-11}$ |
| 40 | $\overline{W_2} \cdot \overline{W_8}$ | $= T_{1-12}$ |

Since the multiplicand gate output depends upon the ANDing of the three input quantities, the multiplicand gate in each multiplier cell produces an output only during the above indicated timing intervals. As illustrated in FIG. 5, these intervals are confined between the vertical dashed line 52 (to the right) and the diagonal dashed line 53 (to the left). Thus, any part of the multiplicand entered prior to the first bit of the present word is truncated and not used in forming the partial product.

For a complete statement of the partial product in two's complement notation at the output of each multiplier cell and for proper summation of partial products of variable word length, the sign bit must continue through the balance of the "present" word. As illustrated in FIG. 5, the sign bit extension continues to the left of the diagonal dashed line 53 until the end of the present word. Sign bit extension is provided by the uninverted gate 57, the sign regeneration block 67, and the regenerative path through OR gate 63 back to a second input of block 67 which includes the one bit delay 64.

The sign bit is regenerated by the loop comprising 67, 63 and 64 at the following bit times in the respective multiplier cells:

| | Gate 70 Inputs | |
|---|---|---|
| cell 34 | $\overline{W_2} \cdot \overline{W_2}$ | $= T_{7-13}$ |
| cell 35 | $\overline{W_2} \cdot \overline{W_3}$ | $= T_{8-13}$ |
| cell 36 | $\overline{W_2} \cdot \overline{W_4}$ | $= T_{9-13}$ |
| cell 37 | $\overline{W_2} \cdot \overline{W_5}$ | $= T_{10-13}$ |
| cell 38 | $\overline{W_2} \cdot \overline{W_6}$ | $= T_{11-13}$ |
| cell 39 | $\overline{W_2} \cdot \overline{W_7}$ | $= T_{12-13}$ |
| cell 40 | $\overline{W_2} \cdot \overline{W_7}$ | $= T_{13-13}$ |

The output of the multiplicand gate 61 and the output of the sign regeneration gate 67 are applied to the separate inputs of the OR gate 63 to produce a complete partial product. The partial product for each multiplier cell may be stated in the following Boolean equation:

$PP1 = a_1 \cdot b_1 \cdot T_{1-6} \quad + \text{sgn rgn} \cdot T_{7-13}$
$PP2 = a_2 \cdot b_2 \cdot T_{1-7} \quad + \text{sgn rgn} \cdot T_{8-13}$
$PP3 = a_3 \cdot T_{1-8} \quad + \text{sgn rgn} \cdot T_{9-13}$
$PP4 = a_4 \cdot b_4 \cdot T_{1-9} \quad + \text{sgn rgn} \cdot T_{10-13}$
$PP5 = a_5 \cdot b_5 \cdot T_{1-10} \quad + \text{sgn rgn} \cdot T_{11-13}$
$PP6 = a_6 \cdot b_6 \cdot T_{1-11} \quad + \text{sgn rgn} \cdot T_{12-13}$
$PP7 = a_7 \cdot b_7 \cdot T_{1-12} \quad + \text{sgn rgn} \cdot T_{13-13}$ where $a_1$ to $a_7$ are the multiplicands successively at the inputs of gates 34 to 40; $b_1$ to $b_7$ are the bits stored at the gates 34 to 40, and the times T are the bit times referenced to the output word (FIG. 5).

The multiplication cell illustrated in the block diagram of FIG. 6 is illustrated in greater detail in the logical design given in FIG. 7. The logical design in FIG. 7 employs "MOSFET" technology in which NAND gate configurations are most desirable in their use of minimum substrate areas. The circuit implementation of the individual gates has not been illustrated since it is well known. The blocks in FIG. 6 have logical counterparts in FIG. 7.

The multiplicand gate 61 of FIG. 6 corresponds to NAND gate 71 of FIG. 7. The timing gate 57 and inverter 65 of FIG. 6 correspond to the NAND gate 95 of FIG. 7 and to its interconnection with NAND gates 70 and 71. These provide the logical ANDing and the symbolic inversion described above.

The multiplier bit latch 62 corresponds to transmission gate 73, inverter 74, OR gates 75, 76, NAND gates 77, 78, and transmission gate 79. The bit stream is coupled through the transmission gate 73 to the input of one OR (75) and after inversion in 74, to an input of the other OR 76. The strobing input is applied from the output of NAND gate 81 (which is the counterpart of the multiplier bit strobe 66 of FIG. 61 to the other inputs of OR gates 75 and 76. The strobing input from 81 is a short pulse of approximately one bit duration. The outputs of the OR gates 75 and 76 are then supplied to the respective first inputs of NAND gates 77, 78. To achieve latching, the outputs of the NAND gates 77 and 78 are cross-coupled back to their other inputs. The output of the multiplier bit latch is taken from the output of NAND gate 78 and fed through the transmission gate 79 to the "second" input of NAND gate 71.

The OR gate 63 of FIG. 6 corresponds to NAND gate 72 of FIG. 7. NAND gate 72 has one input coupled to the output of NAND gate 71 and another coupled to the output of NAND gate 70. The sign regeneration block 67 of FIG. 6 corresponds to the NAND gate 70. The one bit delay 64 of FIG. 6 is provided by the transmission gates 82, 84 and the inverters 83, 85. The NAND gate 72 has its output coupled back to the input of NAND gate 70 successively through the delay elements 82, 83, 84, 85 for sign regeneration. The partial product output of the cell is derived from the output of NAND gate 72.

The one bit multiplicand delay 68 of FIG. 6 corresponds to transmission gate 86, inverter 87, transmission gate 88, inverter 89. The half bit word marker delay 58 corresponds to transmission gate 90 and inverter 91. The half bit word marker delay 59 corresponds to transmission gate 92 and inverter 93.

The reset pulse generator 69 of FIG. 6 is used for resetting internally stored carries in the summers. It corresponds to NAND gate 96 of FIG. 7.

As earlier described in connection with FIG. 4, the summers 41 to 47 arranged in three ranks consolidate the seven bit streams from the multiplication input gates 34 to 40 into a single bit stream representing the sum of the individual bit streams. The consolidation requires one bit of time delay per rank. The summers operate in synchronism with the multiplication gates and any internally stored carry is reset as the least significant bit of each word passes through. The first rank of summers 41 to 44 have their internally stored carries reset by a signal of the nominal bit time $T_1$ which is available from the NAND gate corresponding to 96 of the second multiplication cell 35. The second rank of summers 45 and 46 are reset by signal at the nominal bit time $T_2$ available from the NAND gate corresponding to 96 of the third multiplier cell 36. The final summer 47 is reset by a signal at the nominal bit time of $T_3$ available from the NAND gate corresponding to 96 of the fourth multiplier cell 37. All of the summers are alike except for the last (47) wherein an output NOR gate is substituted for an inverter for zeroing the last three digits of the product. Thus, the summers form a second type of cell which is used repetitively in the design of a multiplier. A logic diagram of the summer is shown in FIG. 8 and will now be described.

The summer cell of FIG. 8 is of conventional design and may be regarded as formed by three principal blocks shown in dotted outline and several ancillary delays. The principal blocks are a first exclusive NOR comprising the elements 100, 101 and 102, a second exclusive NOR comprising the elements 103, 104 and 105, and the "Carry Logic and Delay" comprising the elements 108, 109, 110, 111 and 112. The Carry Logic and Delay block develops one bit of time delay through the transmission gate 110, NAND gate 111 and transmission gate 112. Half bit delays are provided at the input to the first exclusive NOR gate by the transmission gates 98, 99 operating in conjunction with the gates 100 and 102. A half bit of output delay is provided by transmission gate 106 operating in conjunction with inverter 107.

The summer cell functions in the following manner. The A and B bit streams are applied through half bit delays to the first exclusive NOR. The exclusive NOR is composed of two NAND gates 100, 101 and an OR gate 102. The inputs of 100, 102 are connected in parallel to the A and B bit streams. The outputs of the NAND gate 100 and OR gate 102 are coupled to the two inputs of NAND gate 101. The output ($A \oplus B$) of the first exclusive NOR appears at the output of NAND gate 101. Another output ($\overline{A \cdot B}$) is derived from the output of NAND gate 100 and applied to one input of the carry logic and delay block.

The second exclusive NOR of the summer is made up of the NAND gate 103, OR gate 105, and NAND gate 104. The inputs of 103, 105 are paralleled and coupled respectively to the output ($A \overline{\oplus} B$) of the first exclusive NOR and the carry output ($\overline{C}_{i-1}$) of the Carry Logic and Delay block. The outputs of the NAND gate 103 and OR gate 105 are applied respectively to the two inputs of NAND gate 104. The output ($A \overline{\oplus} B \overline{\oplus} \overline{C}_{i-1}$) of the second exclusive NOR appears at the output of NAND gate 104 and is coupled to transmission gate 106 and inverter 107 which provides the second one half bit of delay to the bit stream. The summed output $A \oplus B \oplus C$ appears at the output of the inverter 107.

The carry logic and delay is composed of the OR gate 108, NAND gates 109, 111 and transmission gates 110, 112. Gate 108 has one input coupled to the output ($A \overline{\oplus} B$) of the first exclusive NOR and its output coupled to one input of the NAND gate 109. The other input of the NAND gate 109 is connected to the $\overline{A \cdot B}$ output of NAND gate 100. The output of NAND gate 109 is coupled through the transmission gate 110 to the NAND gate 111, whose other input connection provides the reset function. The output of NAND gate 111 contains the carry ($\overline{C_{i-1}}$) which is delayed one half bit in the transmission gate 112 and coupled in a feedback path back to the other input of OR gate 108.

The logical function of the summer may be outlined in the following table:

| $\overline{C}_{i-1}$ | B | A | Σ | $C_i$ | $\overline{C}_i$ |
|---|---|---|---|---|---|
| 1 | 0 | 0 | 0 | 0 | 1 |

-continued

| $\overline{C}_{i-1}$ | B | A | Σ | $C_i$ | $\overline{C}_i$ |
|---|---|---|---|---|---|
| 1 | 0 | 1 | 1 | 0 | 1 |
| 1 | 1 | 0 | 1 | 0 | 1 |
| 1 | 1 | 1 | 0 | 1 | 0 |
| 0 | 0 | 0 | 1 | 0 | 1 |
| 0 | 0 | 1 | 0 | 1 | 0 |
| 0 | 1 | 0 | 0 | 1 | 0 |
| 0 | 1 | 1 | 1 | 1 | 0 | where
$\overline{C_i} = \overline{AB} + (A \oplus B) \overline{C}_{i-1}$;
+ denotes the OR function;
⊕ denotes the exclusive OR function;
$\overline{\oplus}$ denotes the exclusive NOR function.

The rounding value and zeroing illustrated in FIG. 5 may be understood by reference to FIG. 4 and FIG. 8A. The rounding value 6 is achieved by use of the OR gate 49 which is coupled to the $T_2$ and $T_3$ outputs of multiplier cells 36 and 37, respectively. These are timed to produce a 1 1 0 as the bit stream is passing through the first rank of summers 41, 42, 43 and 44. The addition is made to the input of serial summer 44. The zeroing of the last three bits of the product word is achieved by means of the OR gate 50 whose inputs are coupled to the $T_3$, $T_4$, $T_5$ outputs of multiplier cells 37, 38 and 39. As previously explained, these correspond to the outputs from the counterparts to NAND gate 96 as shown in FIG. 7. The output of the OR gate 50 is coupled through a one bit delay 51 to a gate provided in the last serial summer 47. The gate to serial summer 47 is illustrated in FIG. 8A, where the NOR gate 113 is substituted for the inverter 107. The rounding figure is thus introduced at the time that the first three, least significant bits are passing through the first rank serial summers and the truncation step of the rounding procedure is achieved by zeroing the three low order bits emanating from serial summer 47.

The signed multiplication logic herein described is organized for a minimum number of communication paths at the boundaries of the logic and of the cells. The data streams to and from the logic and between the cells require only single connections since the data is in serial form. In respect to the logic boundaries, they are for entry of the serial data stream for the multiplier, entry of the serial stream for the multiplicand and for exit of the serial data stream of the final product. At the cell boundaries, they are for entry of the multiplier stream, entry and exit of the multiplicand data streams, and for exit of the serial data stream of the partial product. The requirements for the summer cells are similar since the data flows are serial (two in and one out).

The communication paths allocated to timing functions are somewhat more extensive but have been minimized by the use of the timing waveform or word marker. The timing requirements include the provision for two phase clocking into the logic, and in and out of the individual cells. At the boundary to the logic, the timing waveform delayed one bit and inverted ($\overline{w_2}$) is applied by the bus 48 while the uninverted timing waveform ($w_1$) is entered in the first stage of the timing waveform register. At the cell boundaries, a single connection is required for the inverted waveform and two connections are required for entry and exit of the uninverted timing waveform. Within the cell, a timing signal is generated whose termination is controlled by the timing waveform on the shift register and whose initiation is controlled by the inverted timing waveform on the bus. (The term "timing signal" is used to denote the output of the NAND gate 95 (FIG. 7) which is responsive to both timing waveforms, as well as the equivalent combination of signals at the input to the NAND gate 95 which is, effectively, the word time less the output of NAND gate 95.) The two timing waveform connections to the cell provide the control required for internal adjustment of the word length of the multiplicand and the timing information required within the cell to strobe the multiplier bit required for formation of the partial product associated with that cell. The timing waveform register also provides the timing signals required to reset the summers, zero the final summer and introduce the rounding value. This last capability requires only a single connection path from each of the individual multiplication cells to the subsequent summer cells.

The foregoing reduction in intercell connections may be explained, in the case of the multiplication cells, as resulting from a most efficient clustering of the functions into the cells. The "ANDing" essential to the multiplication cell is the central function of the multiplication cell and it forms the partial product. Grouped about it are the multiplier bit latch which stores one multiplier bit at a time, and avoids the need for paralleled input connections, and the stages of the two shift registers. One register is required to properly delay the multiplicand in accordance with the significance of the multiplier bit selected and the other register is required for the timing waveform and provides the strobing required within the cell for multiplier bit selection and for multiplicand truncation as described above.

The advantage of minimum logic boundary communication paths and minimum intercell connection paths is of particular importance in the planar execution of the circuitry characteristic of integrated circuit fabrication. In such fabrication, connection runs involving metallization are particularly expensive since they require large areas of the semiconductor chip and underpasses via poly-silicon paths.

The selection of serial clocking and the selection of serial data flows which are extremely flexible in terms of capacity, and the foregoing minimization in communication paths help to satisfy the fundamental criteria for making the individual cells useful in other equipment applications. The cell layouts continue to be applicable and reusable when new equipment is created requiring greater or lesser capacity. Thus, the cost of equipment redesign is greatly reduced.

In summary, the multiply input gate described heretofore requires only two bused connections and two series connections as inputs, and yields timing data and partial products as outputs, plus series connections to the adjacent cell. Furthermore, the word marker waveform is specifically chosen so that one portion reflects the multiplier word length that is fixed by the number of multiply input gates actually implemented in a particular design, and total word marker waveform length sets the multiplicand word length, which is variable for any given implementation. This capability of electrically varying the multiplicand by means of the word marker yields design flexibility for data and signal processing problems where data precision varies from application to application. Note that the multiplicand word length is variable in the upward direction only, referenced to some minimum word length below which the internal timing of a multiply input gate begins to overlap in an undesirable manner.

For the situation where full double precision products are desired, and extra time usage to produce such a product is acceptable, the said signed multiplication logic can yield such capability in the following manner. If there are $b$ bits in the multiplier, there will be $b-1$ bits truncated from the multiplicand in the top tabulation of FIG. 5. There are three bits in the rounding value; hence one should append $(b-1) + 3$ zeros to the low order portion of the multiplicand, and set the word marker for a $(b-1)+3$ bit times longer period than the single precision case. The result is a product of full double precision.

What we claim as new and desire to secure by Letters Patent of the United States is:

1. Signed multiplication logic for multiplying two serial binary numbers to obtain a serial binary product, the multiplicand containing magnitude and sign information in two's complement notation, the multiplier containing magnitude information and the product containing magnitude and sign information in two's complement notation, said multiplier, multiplicand and product bit streams occurring serially at equal word rates with the least significant bit first in time, said multiplication logic comprising:
   a. a bus to which the multiplier bit stream is supplied in words of an "$n$" plurality of bits,
   b. an "$n$" plurality of binary storage elements coupled to said bus for storing the successive words of said multiplier bit stream, each storage element selecting a bit a pre-determined significance from each word of said multiplier bit stream and storing said selected bit until a bit of like significance occurs in the succeeding word,
   c. a shift register having an "$n$" plurality of connections at one bit intervals to which the multiplicand bit stream is supplied,
   d. an "$n$" plurality of multiplication stages, each connected for multiplier bit entry to a binary storage element and for multiplicand entry to a connection of said multiplicand shift register whose accummulated bits of delay increase in correspondence with the significance of the multiplier bit entered, each stage multiplying a consecutive selection of the most significant bits of a word of the multiplicand by a multiplier bit to form a serial partial product timed in correspondence with its significance, and
   e. a summation network coupled to the output of each of said multiplication stages for consolidating the bit streams representing said partial products into a single bit stream equal to the product.

2. Signed multiplication logic as set forth in claim 1 wherein each of said multiplication stages include means for entering less than all of the bits of the multiplicand, the least significant bits being truncated in inverse relationship with the significance of the multiplier bit entered.

3. Signed multiplication logic as set forth in claim 2 wherein said multiplicand bit truncation means comprises:
   a. means for generating a timing waveform having a portion whose duration is equal to the bit times of a multiplier word, and
   b. a second shift register to which said timing waveform is supplied having connections at one bit intervals, each multiplication stage being connected to said timing shift register to obtain a timing signal for controlling the number of the more significant bits of the multiplicand entered to correspond with the significance of the multiplier bit entered.

4. Signed multiplication logic as set forth in claim 3 wherein each of said multiplication stages comprise a three input gate to which a delayed multiplicand, a stored multiplier bit and said timing signal are applied, the signals at each stage having a duration which is increased in one bit increments in accordance with the delay accorded to said timing waveform, said three input gates logically "anding" said three inputs to produce an output.

5. Signed multiplication logic as set forth in claim 4 having in addition thereto:
 a. a bus to which said timing waveform is supplied at a fixed delay, and wherein
 b. each multiplication stage comprises a gate for producing the timing signal for control of multiplicand bit entry, said gate having one input coupled to said fixed delay timing waveform bus to initiate said timing signal and another input coupled to said timing wave shift register to terminate said timing signal.

6. Signed multiplication logic as set forth in claim 5 wherein each multiplication stage comprises means responsive to said timing signal to repeat the sign bit of said multiplicand the number of bits required to complete the high order portion of the partial product.

7. Signed multiplication logic as set forth in claim 6 wherein means are provided to logically "or" the output of said three input gate and the output of said sign repeating means to produce a full length signed partial product.

8. Signed multiplication logic as set forth in claim 7 wherein:
 said sign bit repeating means comprises a three input gate having
 1. first input coupled to said timing waveform shift register at the connection associated with said multiplication stage to initiate a sign bit repetition,
 2. a second input coupled to said fixed delay timing waveform bus to terminate sign bit repetition, and
 3. a third input coupled through a one bit delay to the output of said logical "or" means for sign bit regeneration.

9. Signed multiplication logic as set forth in claim 7 wherein said summation network comprises a collection of ranked summers, each summer having two serial data inputs coupled to the outputs of two multiplication stages or to the outputs of two summers in a prior rank and producing a serial data output representing the sum of the two inputs after a one bit delay, said summers being arranged in successively diminishing ranks until said serial data is consolidated into a single stream, and means for resetting the internally stored carry bits of each rank as the least significant bit passes through.

10. Signed multiplication logic as set forth in claim 9 wherein said reset means comprises one or more reset pulse generators, each having an input coupled to a connection on said timing waveform register for sensing passage of said timing waveform at a time corresponding to the passage of a word through said rank, and each providing an output pulse at said time to reset the internally stored carry bits of said rank.

11. Signed multiplication logic as set forth in claim 9 wherein the summer in the last rank is provided with means for zeroing one or more of the least significant bits of each word of said serial product.

12. Signed multiplication logic as set forth in claim 11 wherein said zeroing means comprises:
 a. a zeroing gate having two inputs and an output, to one input of which the consolidated data stream from said last ranked summer is applied and to the other input of which a gating signal is applied, said zeroed consolidated data stream being derived from the output thereof,
 b. one or more zeroing pulse generators, each having an input coupled to a connection on said timing waveform register for sensing passage of said timing waveform at a time corresponding to the passage of one of the initial bits of a word through said last ranked summer and producing an output pulse, and
 c. an "or" gate for control of said zeroing gate having a plurality of inputs to which the outputs of said zeroing pulse generators are connected, and producing an output upon the occurrence of an input signal, the output of said "or" gate being coupled to said other input of said zeroing gate.

13. Signed multiplication logic as set forth in claim 9 wherein means are provided for introducing a rounding value to compensate for multiplicand and product truncation.

14. Signed multiplication logic as set forth in claim 13 wherein said compensating value means comprises:
 a. one or more rounding value pulse generators, each having an input coupled to a connection on said timing waveform register for sensing passage of a timing waveform at a time corresponding to the entry of a bit of a given significance at said first rank of summers and producing an output pulse at said time,
 b. an "or" gate for production of said rounding value having a plurality of inputs to which said pulse generator outputs are coupled and producing one or more output pulses corresponding to a desired rounding value, said "or" gate output being coupled to the input of a summer in said first rank for addition to the final product.

15. A complex multiplier for multiplying a complex multiplicand $(a+jb)$ by a complex multiplier $(c+jd)$ to obtain the product $(ac-bd)+j(ad+bc)$, said "$a$" and "$b$" quantities being in two's complement notation and said "$c$" and "$d$" quantities being sign and magnitude notation, said multiplier, multiplicand and product being in serial form with their streams occurring serially at equal word rates with the least significant bit first in time, said complex multiplier comprising:
 a. four signed multiplication logic units, to each of which the input quantities $a$ and $|c|$; $b$ and $|d|$; $a$ and $|d|$; $b$ and $|c|$ are coupled to the respective inputs thereof and each of which produce an output in two's complement notation equal respectively to $a|c|$; $b|d|$; $a|d|$; $b|c|$,
 b. four two's complementers each having a data input coupled respectively to the output of a corresponding signed multiplication logic unit and each having a control input to which the sign of "$c$", inverted sign of "$d$", sign of "$d$" and sign of "$c$" are respectively coupled, and producing an output equal respectively to $ac$;$-bd$; $ad$; $bc$; and c. a first summation network coupled to the output of the first and second two's complementers to obtain the real quantity $(ac - bd)$ and a second summer coupled to the output of the third and fourth two's complementers to obtain the imaginary quantity $(ad + bc)$.

* * * * *